United States Patent [19]
Buehler

[11] 3,839,903
[45] Oct. 8, 1974

[54] METHOD FOR DETERMINING THE MATRIX COMPOSITION OF A TINI BASE ALLOY

[76] Inventor: William J. Buehler, 10613 Montrose Ave., Apt. 3, Bethesda, Md. 20014

[22] Filed: May 1, 1972

[21] Appl. No.: 249,139

Related U.S. Application Data

[62] Division of Ser. No. 42,133, June 1, 1970, Pat. No. 3,672,879, which is a division of Ser. No. 592,069, Nov. 4, 1966, Pat. No. 3,529,958.

[52] U.S. Cl. .................................................. 73/67.1
[51] Int. Cl. ............................................. G01n 29/00
[58] Field of Search ........................... 73/67.1, 67.2

[56] References Cited
UNITED STATES PATENTS
3,308,650  3/1967  Fitzgerald .......................... 73/67.2
3,592,050  7/1971  Nutt et al............................. 73/67.2

Primary Examiner—James J. Gill
Attorney, Agent, or Firm—Craig & Antonelli

[57] ABSTRACT

A method for determining the matrix composition of a TiNi base alloy in which the internal friction of the alloy is determined under varying temperature conditions and the range of values thus determined is correlated to the matrix composition of the alloy.

8 Claims, 16 Drawing Figures

○ — SPONGE Ti
● — NICKEL

MECHANICALLY MIXED AND COMPACTED Ti & Ni BLOCKS

Ti Ni STARTER PLATE

GRAPHITE CRUCIBLE

Ti Ni-BASE ALLOY WIRES — GUIDING ROD

CYLINDRICAL SHEET Ni TUBE SPOT WELDED TO SHAPE

MIXTURE OF Ni & Ti

Ni SHEET BOTTOM SPOT WELDED IN PLACE

MOLTEN TiNi-BASE ALLOY

GRAPHITE CRUCIBLE

Ti — Ni

GRAPHITE CRUCIBLE

MOLTEN TiNi-BASE ALLOY

FIG.3a
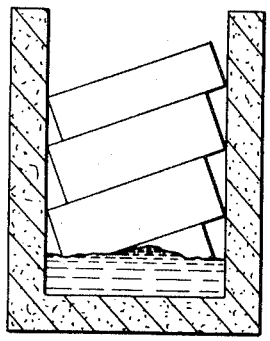
FIG.3b
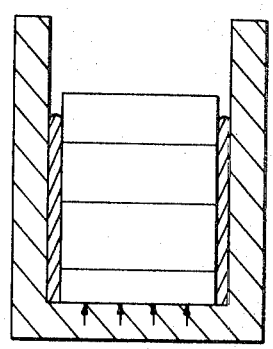
FIG.4
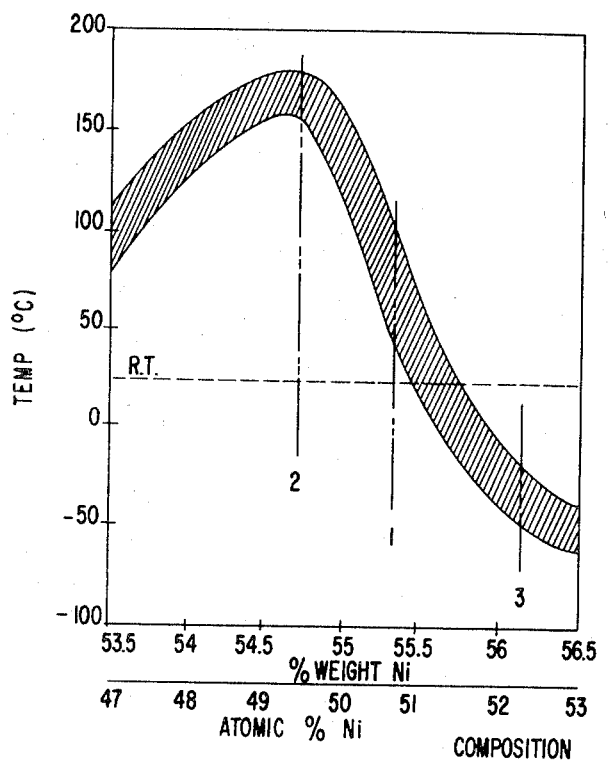
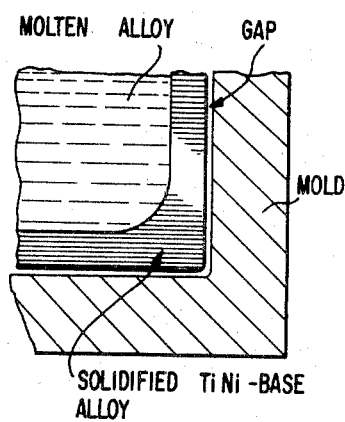
FIG.6
FIG.5
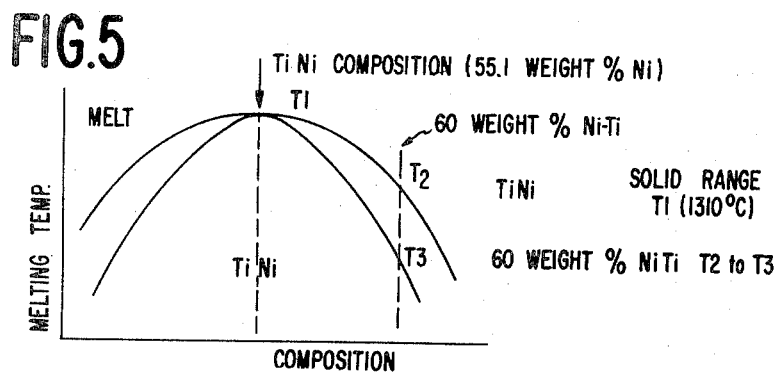

METHOD FOR DETERMINING THE MATRIX COMPOSITION OF A TINI BASE ALLOY

This application is a divisional application of my co-pending application Ser. No. 42,133, filed June 1, 1970, now U.S. Pat. No. 3,672,879, which is a divisional application of the then co-pending application Ser. No. 592,069, filed Nov. 4, 1966, now U.S. Pat. No. 3,529,958.

The present invention relates to a method and apparatus for forming alloys, and more particularly for forming alloys composed of component metals that are reactive in their elemental form with the melting container such as a crucible.

Many techniques and methods have been developed and employed in the prior art in an effort to utilize electrical induction melting methods with their associated mixing and purification as well as temperature control features in connection with the fusion and formation of alloys containing highly reactive component metals such as, for example, Ti, Zr, Hf, Ce, La, etc. However, heretofore, induction methods invariably failed because of the rapid reaction of one or more of these reactive component metals with the container or crucible used for the melt. As a result, other alloying methods with their related shortcomings, have to be employed on such reactive metal alloys. Some of these alternate prior art methods include arc-melting, both of the consumable and non-consumable type, utilizing an insert water-cooled copper crucible to contain the melt; another known technique, the so-called "levitation melting" which utilizes electrical induction to both melt and suspend the molten alloy in the induced field, is not an economical or commercially feasible technique though producing excellent high purity alloys.

Consequently to commercially produce alloys of the TiNi-base type or similar alloys, one was previously limited to some form of consumable or non-consumable arc-melting method. It is to be understood that the term "TiNi base-type alloys," as used herein, refers to the TiNi alloys as described in U.S. Pat. No. 3,174,851 as well as to those ternary, intermediate alloys, such as $TiNi_xCo_{1-x}$, $TiNi_xFe_{1-x}$, etc. as described in the co-pending application Ser. No. 579,185, filed on Sept. 9, 1966, in the name of Fred Wang and William J. Buehler, which discloses the addition of Co, Fe, etc. to the Ti-Ni alloys in question for the purposes of controlling the transition temperature of the near stoichiometric alloy. The French Pat. No. 1,535,373 corresponds to the U.S. application Ser. No. 579,185. While arc-melting is currently employed in melting both titanium and zirconium-base alloys, repeated melting and cycling is required to produce chemically homogeneous alloys. This latter remelting requirement was found particularly necessary in the production of homogeneous TiNi-base alloys.

Another method suggested heretofore for producing a TiNi base alloy is described in my co-pending application Ser. No. 493,940, filed on Oct. 7, 1965, and entitled "Alloy Melting and Casting," now U.S. Pat. No. 3,508,914. The method described in this application of melting nickel first in an MgO crucible (of high purity) followed by charging the titanium directly to the molten nickel works adequately well; however, the molten TiNi alloy cannot be held in the MgO crucible without getting contaminated with oxygen, the oxygen coming from the decomposition of the MgO crucible. As a result thereof, the method described in this application requires rapid handling following the Ti addition. On the other hand, rapid handling may present problems in commercial productions where large heats are involved.

The present invention is therefore concerned with a method of and apparatus for forming, within a suitable container or crucible, relatively unreactive alloys, from highly reactive component metals without undue contamination during the fusion and alloy formation as well as with a method of and apparatus for realizing solid cast ingots from the melt characterized by great ingot efficiency.

It is known from past studies and experiments that elemental Ti or elemental Ni will each react with a graphite crucible. However, near equi-atomic TiNi alloys (based principally upon the TiNi compound phase) show a rather slow rate and limited solubility for carbon. These near stoichiometric TiNi-base alloys take little carbon into solution when these molten alloys are brought into contact with graphite, usually not in excess of 0.04 per cent by weight, and the carbon content does not increase even if the melted TiNi-base alloys are held molten in a graphite crucible for a greater period than 1 hour.

The present invention makes use of this particular discovery and phenomenon of slow rate and limited solubility of the near equi-atomic TiNi alloys of carbon, and essentially consists in so charging a graphite crucible as to prevent direct contact between the elemental Ti and Ni with the walls of the graphite crucible.

The longer period of time to handle the molten alloys as allowed by the use of the present invention has obvious advantages in commercial production, for example, as regards the mixing, composition adjustment, purification, etc. The minute limited quantity of TiC particles in the TiNi matrix, which may form in the course of the method according to the present invention, are widely and uniformly dispersed and are insignificant and can be completely neglected for all practical purposes. Additionally, the present invention is concerned with ingot solidification techniques and suitable mold design therefor to promote greatest ingot efficiency, i.e., to produce a solid cast ingot free of liquid-to-solid shrinkage porosity.

Accordingly, it is an object of the present invention to provide a method and apparatus for deforming alloys composed of component metals that are reactive in their elemental form with the melting container or crucible, which eliminates by simple and relatively inexpensive means the shortcomings and drawbacks encountered in the prior art.

Another object of the present invention resides in a method and apparatus for forming, within a suitable container or crucible, relatively unreactive alloys from highly reactive component metals without undue contamination during the fusion and alloy formation.

A further object of the present invention resides in a method and apparatus for induction melting titanium and nickel to form TiNi base alloys and related alloys containing reactive elements in a graphite or other suitable carbonaceous crucible without the danger of contamination and resulting non-homogeneity.

A still further object of the present invention resides in a method and apparatus for induction melting alloys containing highly reactive component metals in containers normally reacting with these component metals which not only benefit from the associated mixing, composition control and adjustment, purification and temperature control features attendant to induction melting methods but completely and effectively avoid the danger of a rapid reaction of these reactive component metals with the crucible or container used for the melt.

Still another object of the present invention resides in a method and apparatus for forming alloys that are reactive in their elemental form with the melting container which can be carried out on a commercial scale in a highly economic manner.

Still a further object of the present invention resides in a method for producing TiNi base alloys which are chemically homogeneous without the need for repeated melting and cycling.

Another object of the present invention resides in a method for forming TiNi-base alloys which does not require rapid handling, yet assures completely reproducible compositions of chemically homogeneous nature.

A further object of the present invention resides in a method and apparatus for improving the ingot solidification by properly accommodating the liquid-to-solid shrinkage and thus minimizing the shrinkage pipe, porosity, etc.

These and other objects, features, and advantages of the present invention will become more obvious from the following description when taken in connection with the accompanying drawing which shows, for purposes of illustration only, several embodiments in accordance with the present invention, and wherein:

FIGS. 3a and 3b are schematic views illustrating two possible faults in charging to be avoided by the present invention;

FIG. 4 is a diagram showing the transition temperature as a function of composition of a TiNi-base alloy;

FIG. 5 is a diagram illustrating the solidification range of various TiNi-base alloy compositions;

FIG. 6 is a partial schematic cross-sectional view illustrating the solidification shrinkage of the molten base alloy in a prior art mold and the resulting low pressure zone created between the solidification ingot and the mold walls;

Figure 1A:
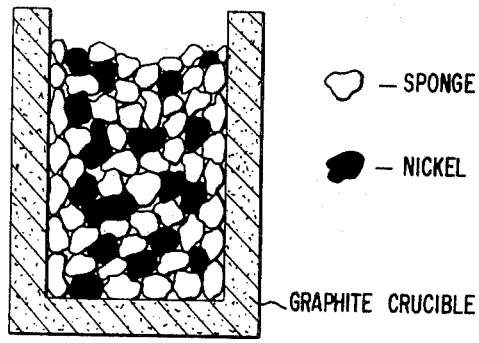
FIGS. 1a and 1b are schematic views showing two extremes possible in random distribution of Ti and Ni metals created by indiscriminately charging elements to the graphite crucible.
Figure 1B:
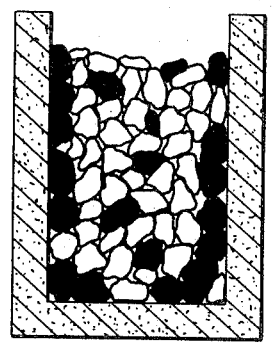

To alloy Ti and Ni in a graphite crucible, prior to its formation of the TiNi compound, can lead to non-reproducible compositions if care is not paid to the way the elements are charged into the graphite crucible. FIGS. 1a and 1b, which illustrate two statistical extremes, are given to describe the importance of charging as related to the present invention. In FIG. 1a, a predominance of Ti is in contact with graphite forming a large amount of TiC before the remaining Ti and Ni can alloy to form the relatively unreactive TiNi. In FIG. 1b, a predominance of Ni is in contact with the graphite; the Ni + C reaction can occur with its associated reaction rate to form a nickel carbide. Both of the situations illustrated in FIGS. 1a and 1b or any statistical variation thereof, will tie up variable quantities of Ti and/or Ni making the resultant TiNi-base alloy variable and unpredictable and incorporate added detrimental carbides.

According to the present invention, as a refinement to melting in a graphite crucible, only the relatively unreactive TiNi alloy is permitted to come in contact with the graphite at all times during the alloying. This minimizes carbon pick-up in the melt, maintains a more constant Ti-to-Ni ratio based upon the initial charge, and produces consistent and predictable composition melts based upon experience, charge element purity, and empirical melting data.

Figure 2A:
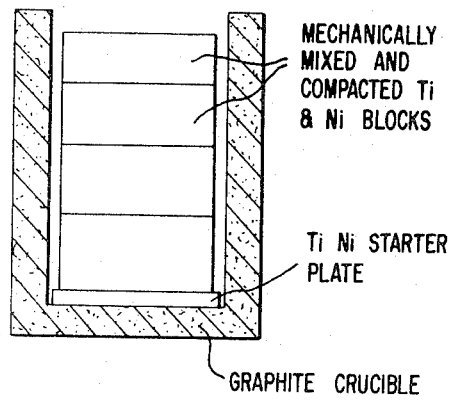
FIGS. 2a, 2b and 2c are schematic views illustrating three different modifications of charging schemes for carrying out the method in accordance with the present invention in order to minimize the actual contact between elemental Ti and Ni with the graphite crucible during induction melting.

To realize the aims of the present invention requires the charge of Ti and Ni be made to a graphite crucible in such a manner that the elemental Ti and Ni have minimum direct contact with the graphite crucible. FIG. 2a illustrates one charging scheme in accordance with the present invention; in this embodiment, a TiNi starter plate or scrap pieces of TiNi alloy (of known composition) are placed at the bottom of the graphite crucible, and mechanically mixed and compacted titanium plus nickel blocks of proper mixture ratio are placed over the TiNi starter plate. The induction field then first melts the TiNi plate, having the lowest melting point of about 1,300°C. on the bottom of the graphite crucible. Additionally, this TiNi plate or scrap pieces are also melted first by virtue of the location thereof in the normally hottest section of the crucible. Following the initial melting of the pre-alloyed TiNi plate, the stacked blocks of mixed Ti + Ni would melt into the molten alloy pool forming additional molten alloy before any elemental Ti and/or Ni could come in contact with the graphite crucible walls. This process is continued until the entire charge is molten and alloyed.

Figure 2C:
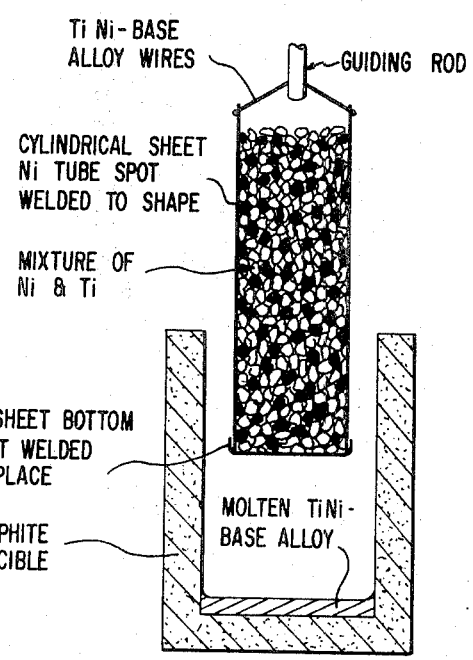
Figure 2B:
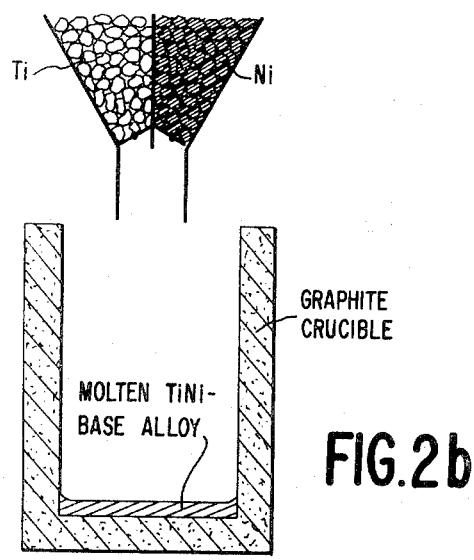

FIG. 2b illustrates an alternative arrangement for charging the graphite crucible to achieve the objects of the present invention. Again, a starter plate of TiNi-base alloy or scraps of TiNi-base alloy are placed at the bottom of the graphite crucible. The crucible is thereupon induction heated in a conventional manner and the elemental Ti and Ni metals are then simultaneously metered into the molten pool of the TiNi-base alloy with the rate controlled in any conventional known manner to prevent Ti and/or Ni coming in direct contact with the graphite. Since numerous devices for simultaneously charging the elemental metals as well as for controlling the charging rate thereof are known in the art and are commercially available, a detailed description is dispensed with herein.

FIGS. 3a and 3b illustrate the only possible contact between the hot graphite crucible and elemental Ti and Ni as might occur in following the method illustrated in FIG. 2a. These possible problems, should they arise can be readily solved by simple mechanical means. Tilting can be arrested by having the stack of compacted blocks guided through holes in their centers by a prealloyed rod that is fastened in a proper vertical position above the crucible. In the alternative, the stacked blocks can similarly be centered and fed vertically through a suitable alloy tube (matching the melt) positioned concentrically in the graphite crucible. These and other obvious methods may be employed to prevent tilting.

The problem of excessive column weight causing the stacked blocks to contact the graphite crucible bottom as shown in FIG. 3b can be avoided by releasing the blocks to the molten alloy pool, from above, one or more at a time to allow the buoyancy or viscosity of the molten alloy pool to float the block or blocks until the elements thereof are dissolved into the molten alloy.

Both problems can also be solved simultaneously by the controlled feeding of a mixed Ti + Ni electrode, similar to a consumable electrode in arc-melting, into the molten alloy bath. Obviously, both problems are non-existent when utilizing the approach schematically illustrated in FIG. 2b. However, in case of use of the technique, illustrated by FIG. 2b, care must be taken (mainly through controlling the rate of feeding) to prevent the migration of particles of elemental Ti and/or Ni to the crucible before solution in the melt as a result of possible surface tension and hydrostatic forces.

FIG. 2c illustrates still another alternative for lowering a Ti + Ni mixture to avoid the shortcomings mentioned in connection with FIGS. 3a and 3b. According to this embodiment, the graphite crucible again contains a starter plate or scrap pieces forming a molten TiNi base alloy at the bottom thereof. The Ti + Ni mixture itself is lowered in this embodiment into the molten pool of the TiNi base alloy within a can of Ni. The can is constituted by a cylindrical sheet of Ni in the form of a tubular member spot-welded into the proper shape with a Ni sheet bottom spot-welded to the tubular member. A guide rod is secured to the cylindrical tubular Ni casing by means of TiNi-base alloy straps or wires. The rate of lowering the TiNi mixture within the Ni can is carefully chosen in accordance with the principles set forth above; when the TiNi straps or wires connecting the Ni can to the guide rod get into the melt and fuse, the guide rod can then be withdrawn.

Utilizing the methods schematically illustrated in FIGS. 2b and 2c obviates the need for compacting the mixed Ti + Ni elements. Obviously, many other variations are possible to accomplish the same end of preventing the crucible from coming into contact with the element Ni and/or Ti while hot.

Utilizing the above-described charging methods, melts of the TiNi type base alloy are possible with very definite homogeneity and composition control. The actual process of induction melting may be accomplished in a chamber where the pressure can vary from a few microns to more than one atmosphere. However, where the chamber pressure exceeds a few microns, it is preferable to utilize an atmosphere of dry, inert gas such as argon, helium, etc.

The induction melting itself only requires sufficient power and proper frequency such as, for example, 3,000 cycles, to rapidly melt the charge and, following melting, to promote suitable melt stirring. The latter which is inherently produced when utilizing induction melting is necessary to maintain proper alloy mixing and chemical homogeneity.

EXAMPLE

The following is an illustrative step-by-step melting operation used to prepare a composition-controlled TiNi base alloy in accordance with the present invention though it is understood that the various steps thereof can be modified and changed within the scope of a person skilled in the art.

I. EQUIPMENT

The equipment utilized for carrying out the present invention includes a conventional vacuum-melting furnace having a chamber, an induction coil, temperature monitoring devices, an induction power supply, gas inlet ports, a vacuum pumping system, etc. Since such vacuum melting furnaces are known, per se, in the prior art, and form no part of the present invention, a detailed description is dispensed with herein. In addition to the conventional vacuum melting furnace, a source of purified inert gases such as helium or argon is desirable. Additionally, a conventional high-purity and dense graphite crucible of any suitable capacity is used. The latter should preferably be thoroughly dried by pre-firing in a vacuum. A suitable mold is used for casting the ingot from the melt as will be described more fully hereinafter.

High purity component metals such as Ti sponge, Ni shot, and elemental additions for instance Co, Fe, etc. are used for charging the graphite crucible.

II. OPERATION a. Before charging the induction melting furnace, Ti sponge and carbonyl Ni shot are mixed and compacted into suitable size compacts. A proper particle size distribution of the Ti sponge will thereby impart more strength to the "green" compacts.

b. The graphite crucible which has been thoroughly dried by pre-firing in a vacuum is charged with a plate or scrap pieces of TiNi alloy. The plates or the scrap pieces should be of any known, desired composition and should be clean and free of surface oxides.

c. Referring to FIG. 2a, the mixed and compacted TiNi sponge and Ni shot is placed on top of the TiNi alloy plate which is on the crucible bottom. Care should be exercised during the charging to keep the elemental Ti and Ni from contacting the graphite crucible.

d. Next the melting chamber is closed tightly and pumped to a reasonably low vacuum, for example, to a vacuum of less than 10 microns.

e. The chamber is thereupon refilled partially to a predetermined pressure with dry argon or helium. The pressure is chosen in relation to the temperature and charge element purity (particularly entrapped gases, e.g., $O_2$, $N_2$, $H_2$, $H_2O$, etc.) to prevent violent boiling as will also be described more fully hereinafter.

f. Next the electric power is applied to the induction coil to heat the graphite crucible. The highest possible input of power commensurate with the particular crucible used, the coil coupling and the capacity of the generator, should be used.

g. Within a short period of time, the crucible will get hot from the bottom to the top. It is preferred according to the present invention that the crucible get hottest in the zone near the TiNi alloy piece. This can be assured by positioning the crucible in such a manner to assure most efficient heating (coupling) at the crucible bottom.

h. The TiNi piece or pieces will melt when the crucible temperature goes above the melting point for the TiNi alloy which is about 1,310°C. Following this, the compacted blocks of the Ti metal and Ni metal will sink vertically and dissolve in the TiNi pool. At this time, the chamber pressure should be sufficiently high to prevent violent boiling which could result in a spattering or mechanical loss of Ti and/or Ni from the melt. Accordingly, the partial refilling of the chamber mentioned in paragraph (e) to some predetermined pressure with dry argon or helium should be so chosen as to prevent violent boiling.

i. When all the elemental Ti and Ni in the compacted blocks has been dissolved and now exist as TiNi base alloy, the electric power input is decreased to a point where the melt temperature is maintained at about 150° to 200°C. above the melting point of the alloy which is being made, for example, a 55.1 per cent by weight of Ni, remainder essentially Ti, a 60 per cent by weight of Ni, remainder essentially Ti, etc. Since the melting points of these various alloys are known, the temperature control at this point poses no problem.

j. The chamber pressure is then gradually lowered, by pumping, until most of the out-gasing and bubbling ceases. This should be done gradually and care should be exercised to prevent going too low too rapidly and produce violent boiling. Also as the pressure is lowered, the temperature of the melt may tend to increase which will require some proportional power input decrease.

k. After alloying, and in particular, after the pressure lowering period, a fume or cloud of fine particles comes out of the melt. These particles appear to be impurities associated with the Ti sponge and the quantity and activity of this fume appears substantially constant from melt to melt. Following the outgasing, if one has a "lock system," melt samples may be taken and checked for transition temperature. Adjustment in Ni, Ti, Co, Fe, etc. may be made to tailor precise transition temperature range.

l. Following the outgasing and fuming of the molten TiNi base alloy, it is ready to be poured into the mold. The melt temperature is adjusted to a level between 100° and 200°C. above the melting point of the alloy in question, and the melt is poured in the vacuum.

m. Pouring is done quickly and a steady flow of alloy is maintained. The graphite crucible is usually preheated at the top prior to pouring. This is done specifically to control the radiation heat loss from the melt and promote proper ingot solidification.

As to the equipment used, care should be taken to avoid leaky furnace chambers, marginal pumping systems, low purity argon and helium, impure and/or improperly dried graphite crucibles as all of these promote formation of uncontrolled oxides ($Ti_4Ni_2O$), nitrides ($Ti_4Ni_2N$), etc. and therewith increase the contamination. These oxides, nitrides, etc. remove disproportionate quantities of Ti and Ni from the alloy and produce increased uncertainty about the final alloy composition.

As to the pressure to be established by pumping, mentioned in II (d) supra, the lower the pressure the better. A value of 10 microns was selected as a reasonable level of compromise. Economics and available pumping systems dictate to a large extent this factor.

The amount of partially refilling the chamber to a predetermined pressure, mentioned in II (e) supra, should be such that no violent boiling would occur, yet not excessive so as to waste argon or helium. Again, a balance would normally be struck between the requirements and the economic factors.

As to the electric power applied, mentioned in II (f), an initial input of about 28 KW for a 12 lb. melt, or 2.3 KW per pound proved successful. After melting, the power was reduced to about 16–18 KW and at this level, i.e., 1.5 KW per pound, there appeared to be good melt stirring.

As mentioned in II (k) supra, quantities of fume and soot were noticed as escaping the melt even at a pressure of about 500 microns. Consequently, very low pressures at this stage may result in excessive boiling or loss of one or both of the component metals.

As illustrated in FIG. 5, TiNi and alloys based on TiNi have rather limited ranges of solidification. The fact that TiNi and its alloys solidify over a narrow range presents both an advantage as well as a disadvantage. The advantage lies in the chemical homogeneity of the solidified melt. On the other hand, the disadvantage lies in the area of producing a solid cast ingot free of liquid-to-solid shrinkage porosity.

If the TiNi base melt is poured into a mold of conventional construction in a vacuum and at a temperature only slightly above the melting point, the melt solidifies in the mold and forms initially a shell that separates from the mold wall as illustrated in FIG. 6. As a result thereof, a continuous gap forms around the solidified alloy shell. Since the gap is at the chamber pressure, it is essentially a vacuum. Owing to the presence of the gap, the heat transfer from the ingot to the mold and from the mold to the furnace wall will be mostly by radiation. This poses a serious problem in producing an ingot that is efficient in terms of limited piping and porosity without altering the chemical homogeneity of the solidified material.

Figure 7A:
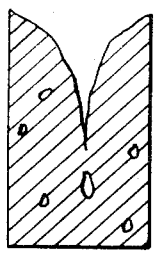
FIG. 7a illustrates schematically an ingot obtained by the use of prior art molds.

FIG. 7a illustrates an ingot obtained with a conventional mold. This ingot not only shows a large shrinkage pipe but also shows other objectionable porosity due to the aforementioned problems in the solidification.

Figure 7B:
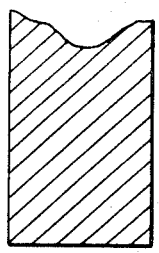
FIG. 7b illustrates schematically a desirable ingot as obtained by the use of a mold in accordance with the present invention.

In contradistinction thereto, FIG. 7b represents an ingot obtained in accordance with the present invention which is devoid of porosity and large piping.

The solution to the underlying problem in accordance with the present invention is based on the recognition that since the solidification in vacuum is one of radiation heat transfer, it can be stated roughly as:

Heat Transfer (Radiation) = $K (T_A^4 - T_B^4)$ where $T_A$ and $T_B$ are the surfaces facing one another.

Consequently, if $T_A \cong T_B$ little or no heat transfer can occur. To promote a situation that provides the desired solidification at a rate that does not alter the chemical homogeneity of the solidified ingot, the present invention utilizes mold design as illustrated in FIGS. 8a and 8b.

Figure 8A:
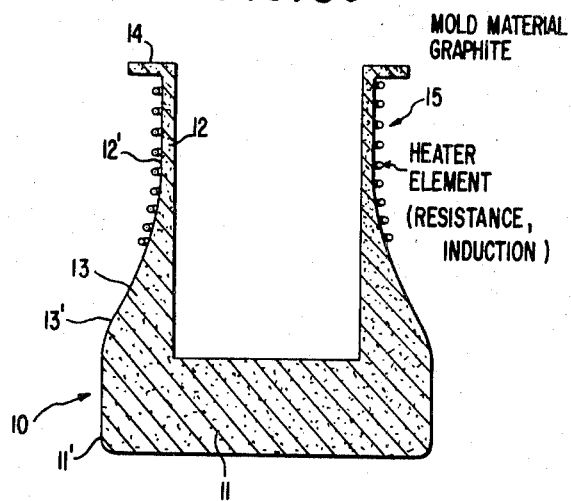
FIGS. 8a and 8b are schematic, cross-sectional views through mold designs in accordance with the present invention.

The mold which may be of any suitable material such as graphite is generally designated in FIG. 8a by reference numeral 10 and includes a base portion 11 and a cylindrical neck portion 12. The cylindrical neck portion 12 is of substantially constant thickness and passes over into the reinforced, wider base portion 11 by way of a transition portion 13 having downwardly outwardly flaring external walls 13' connecting the cylindrical external walls 12' of the neck portion 12 with the cylindrical external walls 11' of the base portion. The neck portion 12, the transition portion 12, as well as the base portion 11 have surfaces so constructed and arranged as to offer an interior mold design of cylindrical shape. Of course, in this embodiment as well as in FIG. 8b, the mold may also have any other desired shape. A cylindrical rim portion 14 which adjoins the upper end of the neck portion 12 projects radially outwardly substantially at right angle with respect to the neck portion 12. A heater element generally designated by reference numeral 15 and of any conventional construction such as a resistance heater, an induction heater, and the like surrounds the neck portion 12 of the mold and may even extend over a part of the transition portion 13. The heater element may be such as to produce a uniform amount of heat per length or may also be so arranged and constructed, for example, by appropriate spacing of the windings of the resistance or induction coil as to produce a properly proportioned amount of heat in the various parts of the mold.

Figure 8B:
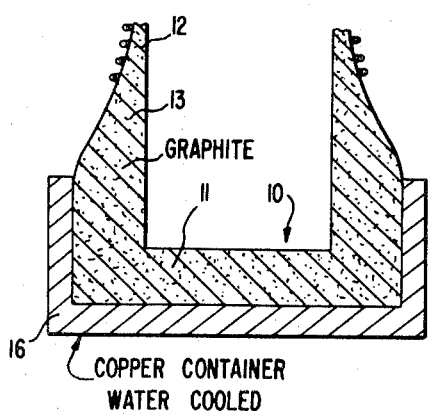

FIG. 8b which is a modified embodiment of a mold in accordance with the present invention, differs from FIG. 8a by the use of a water-cooled copper container. FIG. 8b again consists of a graphite mold generally designated by reference numeral 10 which includes a base portion 11, a neck portion 12, and a transition portion 13. The base portion 11 is placed into a copper container 16 of appropriate shape so that the outer wall surfaces of the base portion 11 are in contact with the inner wall portions of the copper container 16. The copper container 16 may be water-cooled by any conventional means. A suitable heater element (not shown) such as heater 15 of FIG. 8a and a rim portion 14 may also be provided with the mold of FIG. 8b.

Figure 9B:
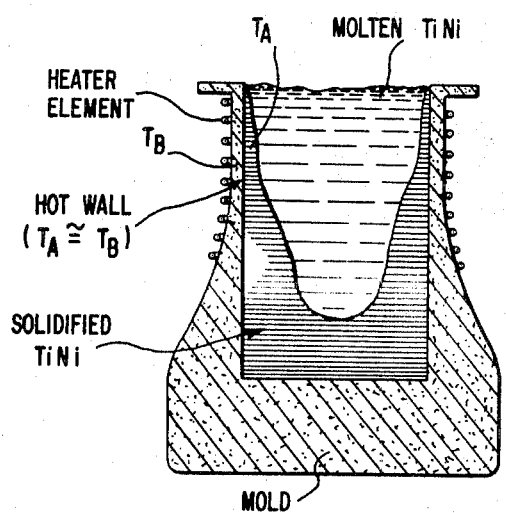
FIGS. 9a and 9b illustrate schematically the solidification in a prior art mold and in a mold according to the present invention.
Figure 9A:
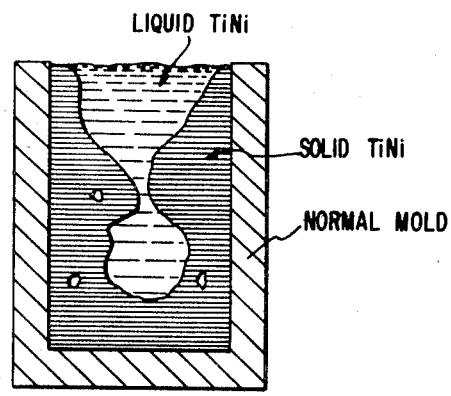

With both of the molds illustrated in FIGS. 8a and 8b, there is less of a chance of improper solidification. FIG. 9a illustrates what takes place in a conventional mold in which liquid TiNi pockets are formed causing problems in porosity and producing an internal and disconnected piping in the final ingot. FIG. 9b illustrates what takes place when utilizing the mold of FIG. 8b in which the solidified TiNi has a temperature $T_A$ about equal to the heated wall 12, 13 of the mold having a temperature of $T_B$. This latter design causes the heat of the alloy to be extracted downward and outward and provides continued solidification from bottom to top. However, a delicate heat transfer balance must be maintained, too slow cooling may produce some degradation of alloy homogeneity.

While only two embodiments of a mold in accordance with the present invention have been described herein, it is understood that the present invention is not limited thereto. Any other suitable shapes or arrangements of a mold, which may also be of any other suitable material, may be provided which assure a solidification substantially in the manner as illustrated in FIG. 9b, predicated on the fact that there is little heat radiation due to equality in temperature between the upper portion of the solidified base alloy and the surrounding mold wall while larger amounts of heat are withdrawn continuously from the bottom of the mold.

The principal advantages of the charging and melting methods according to the present invention resides in the composition control from melt to melt. This control and reproducibility of composition is essential to the formation of alloys with predictable transition temperatures, as illustrated by the transition temperature diagram of FIG. 4. Otherwise, final alloy composition can never be predicted or related to the charge composition with accuracy. Unknown quantities of Ti and/or Ni are involved in separate reactions forming carbides of these metals, thus impoverishing the matrix alloy of these elements and yielding an unpredictable final matrix composition, unless the present invention is adopted which eliminates the reaction between the elemental metals and the crucible material.

From the foregoing it is clear that a major problem in producing the TiNi base alloys lies in controlling the composition and homogeneity of the alloyed material. That is certain contaminants will combine with titanium and nickel metals, in an inconsistent and disproportionate manner, and thus vary the alloy "matrix" composition. Typical reactions with oxygen, nitrogen and carbon are given below:

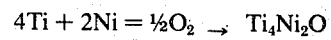

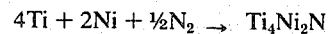

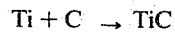

From these typical reactions, it can be seen that the TiNi base alloys are essentially a "matrix" with the above non-metallic inclusions dispersed in this "matrix." Since the unique properties of the TiNi base alloys are dependent principally upon the "matrix" composition (e.g., martensitic transition temperature, acoustic damping, mechanical memory, hardening capability, etc. as described in U.S. Pat. No. 3,174,851) it is of prime importance in alloying to produce the desired and consistent "matrix" compositions and be able to conclusively determine the "matrix" composition. The teachings of this application provide an economical and desirable method of preparing quality and controlled alloys. To determine the "matrix" composition of near stoichiometric TiNi alloys on the other hand requires a unique approach. Standard chemical analysis is somewhat valueless because the quantities of the elements determined are a "total" in the alloy. This means the Ti, Ni, C, $O_2$, etc. are the summation of those found in both the "matrix" and "non-metallic" inclusions. The present application discloses an alternative approach to this problem as it has been consistently shown that acoustic damping, no matter how performed, e.g., torsion-pendulum, striking a simply suspended bar, etc., is a highly sensitive means of quickly and efficiently gaining preferential insight into the "matrix" composition. The drastic acoustic damping change that occurs as a natural physical phenomenon at the structure transition temperature in near TiNi stoichiometric alloys is extremely distinct and almost completely dependent upon the precise Ti : Ni atomic ratio in the "matrix." Thus, by determining the acoustic damping transition temperature of an unknown alloy and comparing these data with a calibration curve on known composition alloys a direct and simple determination of "matrix" composition is possible. For example, the transition temperature for the four alloys given in Table I are very similar, yet experimental errors in chemical analysis and for the above-stated reasons, the Ni composition is shown to vary plus or minus 0.4 per cent by weight. This is indicative of the usefulness of acoustic damping (internal friction) as an analytical tool in connection with near stoichiometric TiNi binary alloys and Co and Fe substituted ternary combinations thereof.

TABLE I

Comparison of the Quantities of the Elements Charged, to Produce TiNi, With the Analysis of the Final Alloys

| Charge Composition (wt. %) | | | Analytical Composition of Alloy (wt. %) | | |
|---|---|---|---|---|---|
| Ni | C | $O_2$* | Ni | C | $O_2$ |
| 55.0 | 0.02 | 0.046 | 54.59 | 0.037 | — |
| 55.0 | 0.02 | 0.046 | 54.88 | 0.038 | — |
| 55.0 | 0.02 | 0.046 | 55.40 | 0.033 | — |
| 55.0 | 0.02 | 0.046 | 55.13 | 0.042 | — |

* Based upon all of the oxygen being contributed by the titanium charge material in form of $O_2$ plus the decomposition of $H_2O$ vapor in the charge.

From the foregoing table, it is clear that the amount of pick-up of C from the graphite crucible, when using the present invention, is consistently nominal and of a value completely insignificant to the properties of the alloys as shown by the small increase in the amount of C in the alloy, when starting with a constant amount of C in the charge composition. Yet this insignificant increase is a substantially consistent amount which allows a consistent empirical variation in the charge to yield a final alloy with a predetermned matrix composition.

The method of determining the "matrix" composition by measuring the internal friction, e.g., by acoustic damping is also particularly suitable for use during the production of the alloy. Small amounts of a sample of the molten alloy may be removed from the crucible, for example, by way of a vacuum-lock system, may then be cooled and thereupon subjected to a test for determining the internal friction of the sample, e.g., by measuring the acoustic damping thereof. All of this can be done while the alloy is still in molten condition in the crucible so that the matrix composition in the crucible can be adjusted by the selective addition of either nickel or titanium as may be required from the results of this test to produce the desired matrix composition in the final alloy product.

The term "internal friction" as used in this application refers to the amount of acoustic energy absorbed in a given material and converted into some other form of energy as determined, for example, by measuring the acoustic damping characteristics of a given material.

While I have shown and described several embodiments in accordance with the present invention, it is understood that the present invention is not limited thereto but is susceptible of numerous changes and modifications as known to a person skilled in the art; for example, the methods and apparatus of the present invention may also be used for forming alloys and casting ingots of other metals which possess the same characteristics to the crucible material in their elemental and alloyed condition and which exhibit the same solidification characteristics. Additionally, the mold according to the present invention may be used in lieu of the so-called "Hot Top" type mold or in conjunction therewith; in the latter case the "Hot Top" is placed on top of the ingot mold in the usual manner. Furthermore, the auxiliary heating means 15 may also be extended to the "Hot Top" selecting a suitable number and distribution of turns to achieve the desired temperature gradients. Moreover, any conventional graphite crucible may be used, such as conventional high-density, high-purity graphite crucibles, pyrolytic graphite crucibles, etc. The mold may be made of any known appropriate material, though graphite molds are also suitable for the present invention.

Consequently, I do not wish to be limited to the details shown and described herein but intend to cover all such changes and modifications as are encompassed by the scope of the appended claims.

What I claim is:

1. A method for determining the matrix composition of a TiNi-base alloy, comprising the step of determining the internal friction of the alloy under varying temperature conditions, and correlating the range of values thus determined to the matrix composition of the alloy.

2. A method according to claim 1, wherein the internal friction is determined by acoustic damping.

3. A method of determining the matrix composition of a TiNi-base alloy, comprising the step of determining the internal friction of the alloy in question under varying temperature conditions, and comparing the range of values of the thus determined internal friction with a calibration curve on known composition alloys to enable a determination of matrix composition of the alloy in question.

4. A method according to claim 3, wherein the internal friction of the alloy in question is determined by measuring the acoustic damping thereof.

5. A method according to claim 4, wherein the alloy in question is an at least near stoichiometric TiNi-base alloy.

6. A method according to claim 3, wherein the alloy in question is an at least near stoichiometric TiNi-base alloy.

7. A method for determining the matrix composition of a TiNi-base alloy, which comprises taking a sample of the alloy, determining a characteristic of the internal friction of the alloy under varying temperature conditions, and comparing such characteristics with predetermined values of such chaacteristics indicative of matrix composition.

8. A method according to claim 7, wherein the acoustic damping transition temperature of the alloy is determined and is compared with predetermined values of such transition temperature corresponding to a range of matrix compositions.

* * * * *